United States Patent [19]
Hardisky

[11] Patent Number: 5,097,377
[45] Date of Patent: Mar. 17, 1992

[54] DEVICE TO REPLACE RECORDING ENABLING TABS IN VHS FORMAT VIDEO TAPE CASSETTES

[76] Inventor: Robert A. Hardisky, R.D. 2, Box 582C, New Wilmington, Pa. 16142

[21] Appl. No.: 603,406

[22] Filed: Oct. 26, 1990

[51] Int. Cl.$^5$ .............................. G11B 23/087
[52] U.S. Cl. .................................................. 360/132
[58] Field of Search ................. 360/132, 137, 60; 242/199

[56] References Cited

U.S. PATENT DOCUMENTS

| | | | |
|---|---|---|---|
| 4,012,011 | 3/1977 | Saito | 360/132 |
| 4,044,386 | 8/1977 | Satou et al. | 360/132 |
| 4,607,299 | 8/1986 | Dishi et al. | 360/60 |
| 4,665,456 | 5/1987 | Ahlberg et al. | 360/137 |
| 4,754,359 | 6/1988 | Molnar | 360/137 |
| 4,811,150 | 3/1989 | Sciggs et al. | 360/132 |

*Primary Examiner*—Robert S. Tupper
*Attorney, Agent, or Firm*—Carothers & Carothers

[57] ABSTRACT

This device pertains to video recorders and in particular to a device for replacing a previously removed record enabling safety tab so that subsequent re-recording on a video tape cassette may be made. The one piece device is basically generally C-shaped in configuration with an upper leg engaging an upper surface of the video tape cassette housing and a lower leg which protrudes into the exposed record inhibiting cavity of the video cassette housing. The lower leg is further provided with an upwardly projecting protrusion that projects into a recess provided at the upper side of this exposed safety cavity, and these upper and lower legs are jointed together by a vertical leg. This clamp may be snapped into and out of position on a video cassette housing. The vertical connecting leg further extends downwardly such that it substantially covers over the exposed recording inhibiting cavity to enable recording when the device is snapped into position on the video cassette housing.

4 Claims, 1 Drawing Sheet

DEVICE TO REPLACE RECORDING ENABLING TABS IN VHS FORMAT VIDEO TAPE CASSETTES

BACKGROUND OF THE INVENTION

The present invention relates to a video tape cassette in VHS format, and more particularly the device of the present invention permits a user to re-record over VHS video tape cassettes that have had the protective recording enabling tab removed.

In order to prevent accidental erasure of recorded material on VHS video tape format cassettes, the housing for such cassettes are provided with a safety tab which may be removed at the rear thereof by breaking them off. The manufacturer normally advises that in order to record on a cassette that has had its safety tab removed, one simply covers the safety hole or cavity with vinyl tape.

This solution for re-recording and replacing the recording enabling tab is not always satisfactory and reliable as in time the tape may sag slightly over the opening and cause attempted recordings to stop at critical times. In addition, it is possible for the tape to become dislodged from the cassette housing and cause damage to the mechanism in the video cassette recorder.

It is accordingly more desirable to have a device that can be reused many times with ease and will not have the aforedescribed disadvantages of using vinyl tape and will in addition provide a clean and neat appearance.

An example of such a device for replacing vinyl tape as a means to replace the recording enabling tab, is illustrated in U.S. Pat. No. 4,811,150 issued on Mar. 7, 1989 for DEVICE TO REPLACE SAFETY TAB IN VHS FORMAT VIDEO TAPES.

The device described in this patent clearly accomplishes the desired results, but is on the other hand constructed of two separate pieces and one piece must be permanently attached to the inner rear wall of the cavity that is exposed on a cassette housing when the break-off tab is removed. Then a second piece is provided which is removable and mates to the first piece in order to fill up the cavity, thereby replacing the formerly removed break-off tab.

The problem, of course, with this arrangement is that the first piece which is permanently attached to the cassette housing in the cavity cannot be used again on other VHS cassettes and secondly the small second piece or tab may be readily lost or misplaced and may further be difficult to grasp for removal after it has been placed in the cavity in mating position with the first piece.

It is therefore desirable to have a device which may be reused many times on different cassette housings and may be readily handled and attached and detached and is not so small that it is easily lost or misplaced.

SUMMARY OF THE INVENTION

The recording enabling device of the present invention, which replaces the broken off safety recording inhibiting tab on a VHS format video tape cassette housing, provides these latter mentioned objects and advantages.

The device of the present invention consists of a clamp having a C-shaped configuration wherein it is provided with an upper generally horizontal leg for engaging an upper surface of a video tape cassette housing and a lower generally horizontal leg which protrudes into the exposed cavity and has an upwardly projecting protrusion for reception in a recess provided in the upper side of the exposed safety break-off cavity of the video tape cassette housing. This cavity of course remains after the recording enabling safety break-off tab has been removed. This upper and lower leg are joined with a vertical leg portion such that the upper and lower legs are held together so that this clamp may be snapped into position on the edge of a video cassette cartridge housing with the protrusion on the lower leg extending upwardly into the upper recess of the exposed recording inhibiting cavity. In addition, this vertical leg portion connecting the upper and lower horizontal legs extends downwardly beyond this protrusion on the lower leg to substantially cover over the exposed recording inhibiting cavity for enabling recording.

In order to provide an even more stable device which is more readily removeable, a bottom leg on this clamp may also be provided which is joined to the bottom of the downwardly extending portion of the verticle leg which covers the exposed recording inhibiting cavity, such that this horizontal bottom leg of the clamp gives the clamp an E-shaped configuration. This bottom leg engages a bottom surface of the video tape cassette housing.

While this bottom leg portion is not an essential part of the device, the clamp device may be more readily grasped and snapped on to or snapped off of the video cassette housing.

This clamp device of the present invention is preferably made of plastic or plastic like material to give it a flexible snap action.

BRIEF DESCRIPTION OF THE DRAWINGS

Other objects and advantages appear in the following description and claims.

The accompanying drawings show, for the purpose of exemplification, without limiting the invention or the claims thereto, certain practical embodiments illustrating the principals of the invention wherein:

DETAILED DESCRIPTION OF A PREFERRED EMBODIMENT

Figure 1:
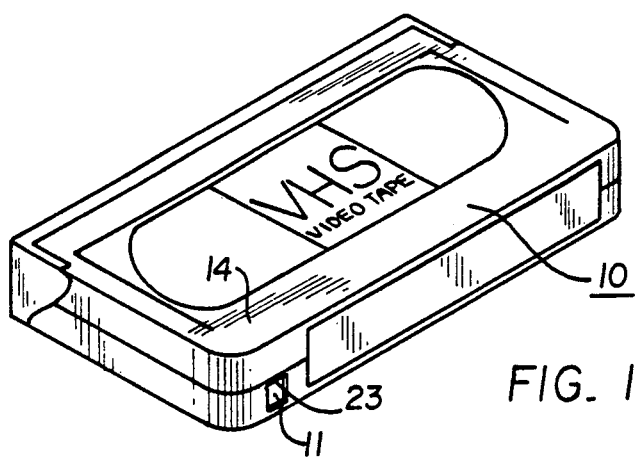
FIG. 1 is an isometric view showing a VHS format video tape cassette housing with the recording inhibiting cavity exposed after removal of the recording enabling safety tab.

Referring to the drawings, FIG. 1 illustrates a conventional VHS video tape cassette housing 10 with its recording enabling safety break-off tab (not shown) removed thereby exposing recording inhibiting cavity 11. An enlarged view of cavity 11 is illustrated in the exploded isometric view of FIG. 2 and a cross-section of the interior thereof is shown in detail in FIG. 3.

Figure 2:
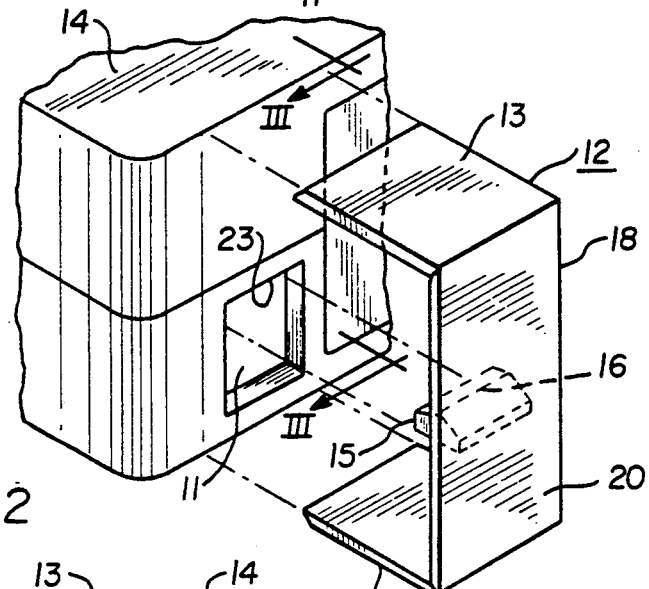
FIG. 2 shows an exploded isometric view of the device of the present invention in combination with the tape cassette cavity portion of the cassette housing shown in FIG. 1.
Figure 3:
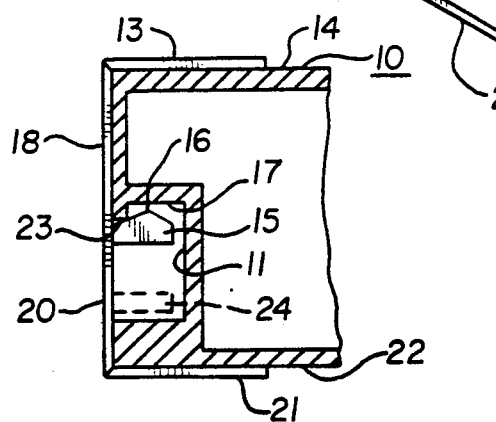
FIG. 3 is a view in side elevation illustrating the device of FIG. 2 in engagement with the tape cassette cavity and with the tape cassette shown in partial section as seen along section line III—III of FIG. 2 to exposed the interior of the cavity.
Figure 4:
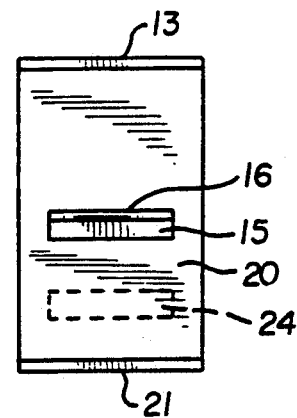
FIG. 4 is a view in back elevation of the device of the present invention as illustrated in FIG. 2.

With particular reference to FIG. 2, 3 and 4 the recording enabling device 12 of the present invention generally consists of a C-shaped clamp which has an upper generally horizontal leg 13 for engaging the upper surface 14 of video cassette housing 10, a lower generally horizontal leg 15. FIG. 15 has an upwardly projecting protrusion 16 which is received in upper recess 17 provided in the upper side of exposed cavity 11 of video tape cassette housing 10, as illustrated in FIG. 3. This C-shaped clamp configuration further consists of vertical connecting leg 18 which joins upper leg 13 and lower leg 15 together, thereby completing the C-shaped configuration such that the clamp may be snapped into position on the video cassette housing 10 with the protrusion 16 extending into the upper recess 17 of the exposed recording inhibiting cavity 11 as illustrated in FIG. 3.

The vertical connecting leg 18 further extends downwardly beyond protruding 16 of lower leg 15 to substantially cover over the exposed recording inhibiting cavity 11 in a manner as illustrated at 20, thereby enabling additional recording on the VHS video tape contained within housing 10.

This is the basic minimum number of elements which are required to be combined in order to construct the recording enabling device of the present invention and this minimum combination of elements is shown in the embodiments of FIG. 3.

Figure 5:
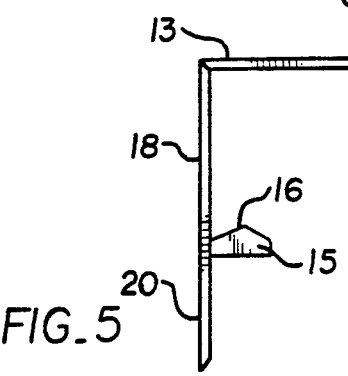
FIG. 5 shows a modified version of the clamp device of the present invention shown in FIGS. 2 through 4 without the video cassette housing wherein the bottom leg portion of the device is not provided.

It should be noted that the device of the present invention as illustrated in FIGS. 2, 3 and 4 includes a bottom generally horizontal leg 21 which is rigidly joined as an integral part of the downwardly extending portion 20 of the clamp device 12 of the present invention, that covers over the recording inhibiting cavity 11. This bottom leg 21, although not required for inclusion as illustrated in FIG. 5, nevertheless advantageously provides an easier means for one to grip the entire clamp and snap it into position or snap it out of position onto or away from the cartridge housing 10. With the addition of this bottom leg portion 21, the clamp is provided with a general overall appearance of an E-shaped configuration.

This bottom leg 21 engages the bottom surface 22 video tape cassette housing 10 as illustrated in FIG. 3.

The entire clamp 12 is constructed or molded of plastic or plastic like material so it is provided in a one piece configuration which is sufficiently flexible to permit upwardly extending protrusion 16 to slide or snap past downward extending lip 23, and the recording enabling clamp device 12 is thus either snapped into or out of position on housing 10.

To provide even further stability to the device 12, a lower horizontal protrusion 24 may also be integrally provided on device 12 for protrusion into cavity 11.

In addition, all of the side edges of the recording enabling device 12 of the present invention may be provided with beveled edges as illustrated to assist in providing a clean appearance of the device and to further assist in removing the device by providing one with an easier means to grasp device 12 with ones fingernails or the like.

I claim:

1. A device that will allow recording on a video tape cassette that has had its safety break-off tab removed from its housing, thereby exposing a recording inhibiting cavity having a recess in the upper side thereof; comprising: C-shaped clamp means having an upper generally horizontal leg for engaging an upper surface of a video tape cassette housing, a lower generally horizontal leg having an upwardly projecting protrusion for reception in a recess provided in the upper side of an exposed safety break-off cavity of a video tape cassette housing, and a connecting vertical leg joining said upper and lower legs together so that said clamp means may be snapped into position on a video cassette housing with said protrusion on said lower leg extending into the upper recess of an exposed recording inhibiting cavity, said connecting leg extending downwardly beyond said protrusion on said lower leg to substantially cover over an exposed recording inhibiting cavity for enabling recording.

2. The device of claim 1 wherein said C-shaped clamp means is made of a plastic like material.

3. The device of claim 1 including a third generally horizontal bottom leg joined to the bottom of said downwardly extending portion of said connecting leg for engaging a bottom surface of a video tape cassette housing, thereby giving said clamp means an E-shaped configuration.

4. The device of claim 3 wherein said E-shaped clamp means is made of a plastic like material.

* * * * *